(12) United States Patent
Stevenson

(10) Patent No.: US 6,609,743 B1
(45) Date of Patent: Aug. 26, 2003

(54) VEHICLE BED EXTENDER UNIT WITH PROTECTIVE TOP COVER SHEET

(75) Inventor: Robin Stevenson, Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/242,153

(22) Filed: Sep. 12, 2002

(51) Int. Cl.$^7$ .............................................. B62D 33/08
(52) U.S. Cl. ............................... 296/26.11; 296/26.08; 296/50; 296/56; 296/98
(58) Field of Search ..................... 296/26.08, 26.11, 296/50, 56, 98

(56) References Cited

U.S. PATENT DOCUMENTS

| | | | | |
|---|---|---|---|---|
| 1,266,521 A | * | 5/1918 | Norquist | 296/26.11 |
| 3,146,824 A | * | 9/1964 | Veillleux | 296/98 |
| 4,223,939 A | * | 9/1980 | Beggs | 296/26.11 |
| 4,792,178 A | * | 12/1988 | Kokx | 296/98 |
| 5,058,956 A | | 10/1991 | Godwin, Sr. | 298/23 |
| 5,087,091 A | * | 2/1992 | Madill | 296/26.11 |
| 5,350,213 A | * | 9/1994 | Bernardo | 296/98 |
| 5,456,511 A | | 10/1995 | Webber | 296/26 |
| D380,707 S | | 7/1997 | Gallegus | D12/98 |
| 5,655,807 A | * | 8/1997 | Rosario | 296/98 |
| 5,658,033 A | | 8/1997 | Delaune | 296/26 |
| 5,755,480 A | | 5/1998 | Bryan | 296/26 |
| 5,758,921 A | * | 6/1998 | Hall | 296/98 |
| 5,765,892 A | | 6/1998 | Covington | 296/26 |
| 5,775,765 A | * | 7/1998 | Kintz | 296/98 |
| 5,806,907 A | | 9/1998 | Martinus et al. | 296/26.11 |
| 5,816,637 A | | 10/1998 | Adams et al. | 296/26.09 |
| 5,826,932 A | | 10/1998 | DeSimone | 296/57.1 |
| 5,887,937 A | | 3/1999 | Searfoss | 296/122 |
| 5,975,608 A | * | 11/1999 | Jarman | 296/26.11 |
| 6,053,556 A | * | 4/2000 | Webb | 296/98 |
| 6,082,801 A | | 7/2000 | Owen et al. | 296/26.11 |
| 6,113,176 A | * | 9/2000 | Bernardo | 296/98 |
| 6,155,622 A | * | 12/2000 | Reed | 296/26.08 |
| 6,276,735 B1 | * | 8/2001 | Champion | 296/98 |
| 2002/0096901 A1 | * | 7/2002 | Iafrate et al. | 296/26.11 |

* cited by examiner

Primary Examiner—D. Glenn Dayoan
Assistant Examiner—Lori L Coletta
(74) Attorney, Agent, or Firm—Kathryn A. Marra

(57) ABSTRACT

A cover and extender unit for the bed of a motor vehicle bounded by a forward wall, opposing side walls and a pivoted rear tailgate comprising a pivoting frame having opposing and laterally spaced sides that in a stowed position lie along the opposing interior surfaces of the side walls of the vehicle bed. Additionally, the frame has a transversely extending closure panel operatively interconnected between the sides at predetermined points adjacent to the forward ends thereof so that it may be used as a swingable tailgate when the unit is in an extended position. The frame has a flexible, sheet—like top cover that rolls up on a cylindrical spring powered roller operatively mounted in cover housing. The cover unrolls on frame deployment to shelter the truck bed. The frame is mounted by side pivot construction for limited pivotal movement relative to the side walls of the bed near the aft ends thereof allowing it to be turned 180 degrees rearward as a unit from the stowed to an extended bed cover position terminating at a point proximate to the extremity of the lowered tailgate. The frame and its cover can be readily returned to the stored position by turning the unit forward 180 degrees.

9 Claims, 8 Drawing Sheets

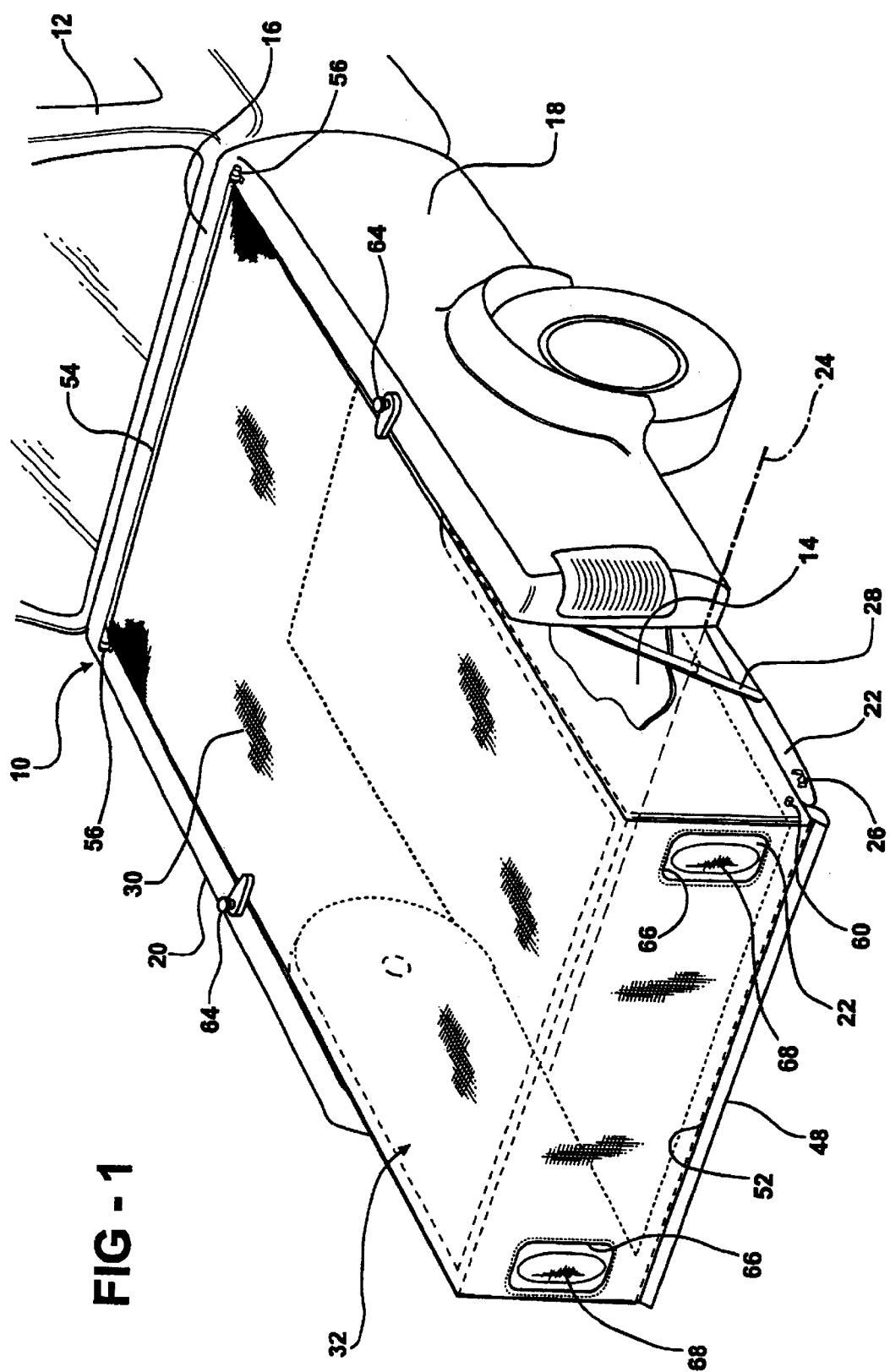

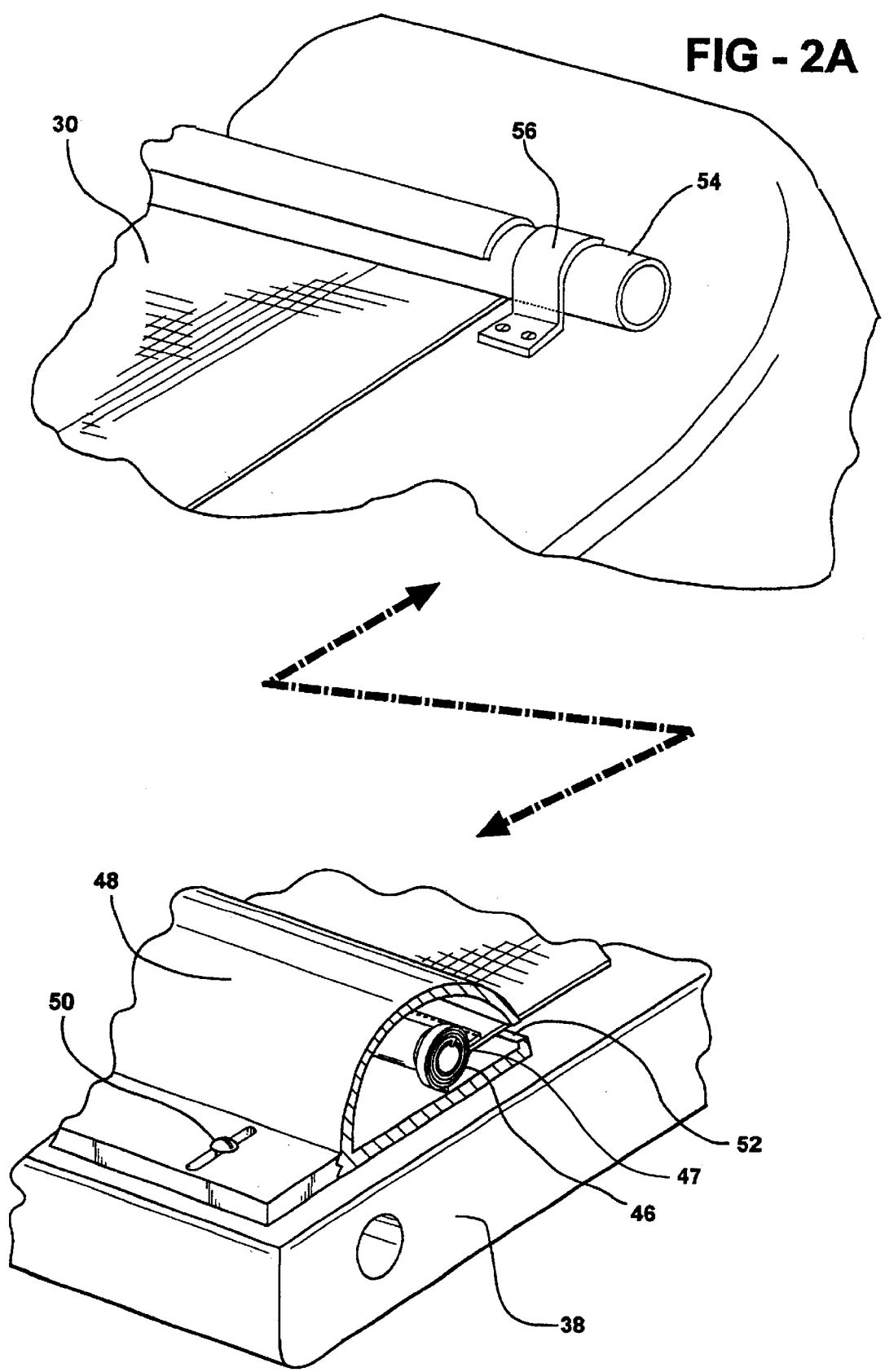

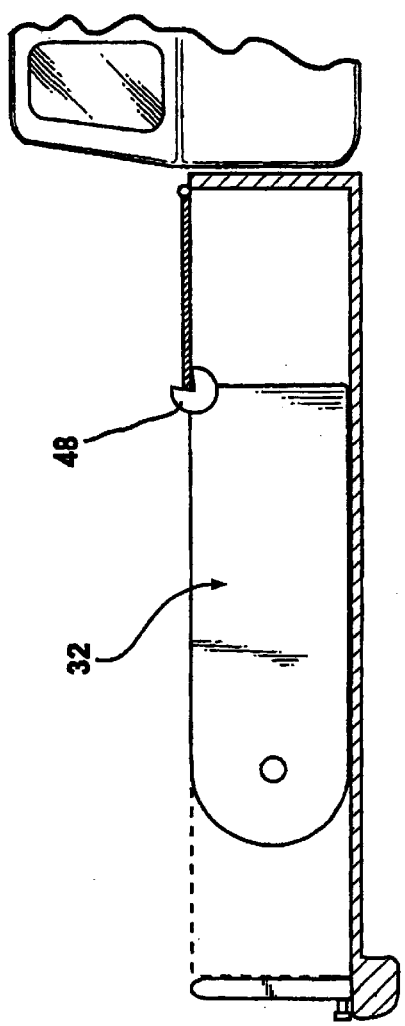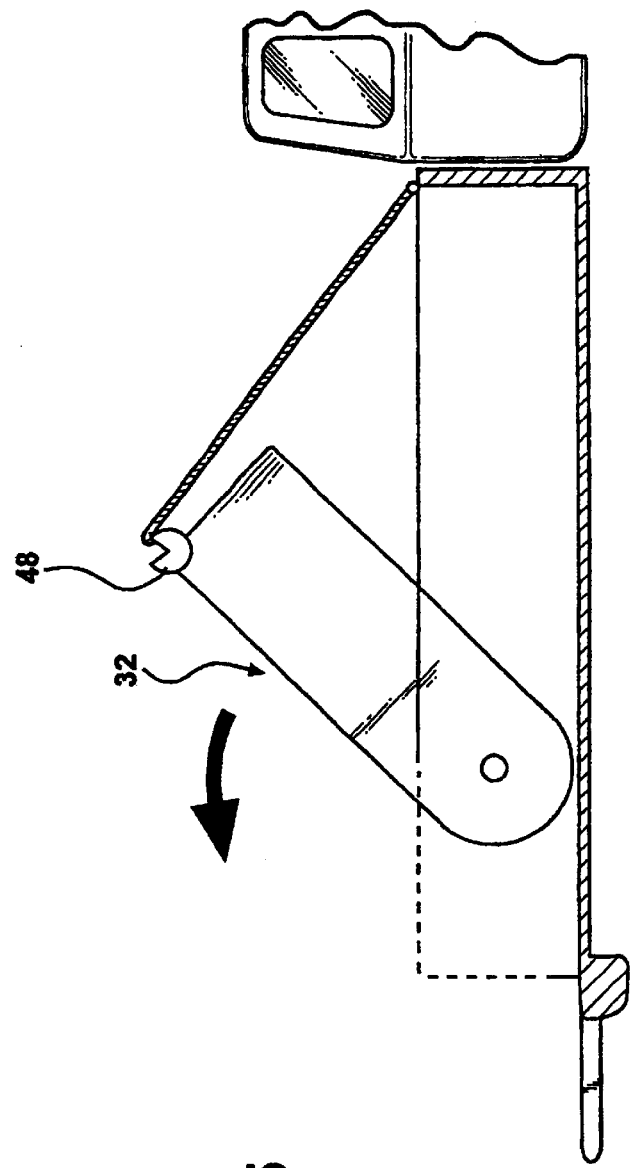
FIG-4
FIG-5

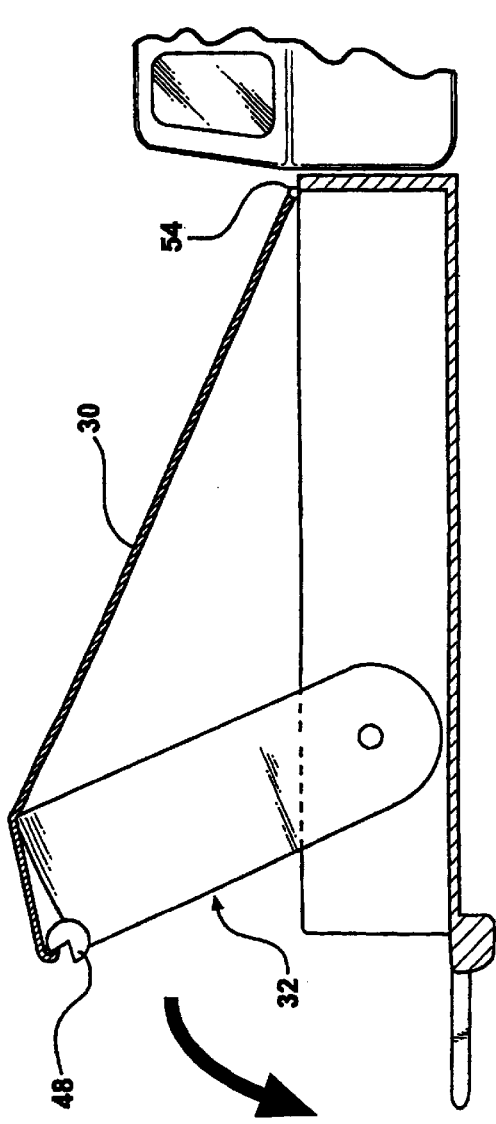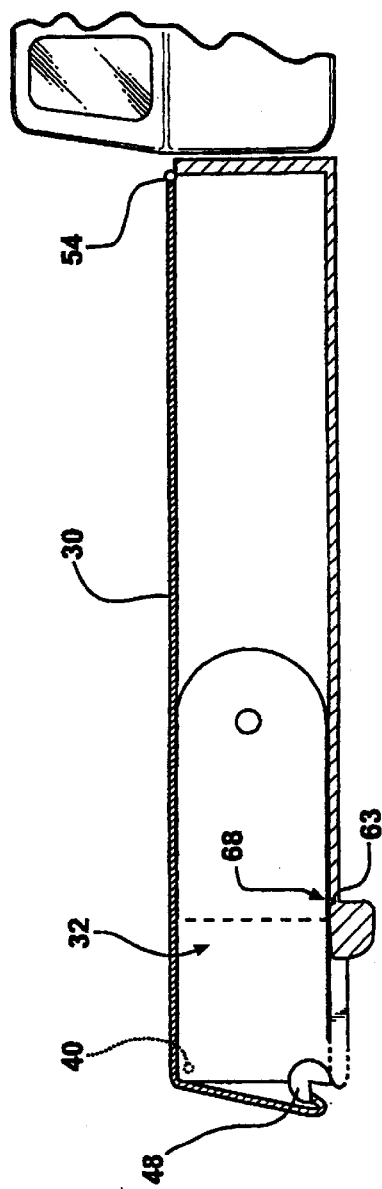
FIG-6
FIG-7

VEHICLE BED EXTENDER UNIT WITH PROTECTIVE TOP COVER SHEET

TECHNICAL FIELD

This invention relates to improvements in the selective lengthwise extension and top covering of the cargo beds of vehicles and more particularly to a new and improved bed extension unit having a pliable top cover sheet of protective material carried by an associated bed extension frame that can be operatively attached to the side walls of the vehicle bed so that it can be turned between a stored position and a fully-covered, bed-extended position.

BACKGROUND OF THE INVENTION

Engine powered utility vehicles such as pick-up trucks and some SUV pick-up units have forward cabs and rear beds that are generally designed to conveniently and economically haul a wide range of cargo from bulky and heavy loads to small parcels. Protective covers are frequently added to such vehicles to enclose the beds thereof and protect the cargo. In some designs protective covering sheets are deployable from a spring powered roller assembly mounted in a housing supported at the front of the vehicle bed to facilitate the covering of loads carried on the bed. See U.S. Pat. No. 3,146,824 issued Sep. 1, 1964 to Veilleux for Apparatus for Covering Truck Bodies, for example. However, with the progressively increasing use of such vehicle for personal transportation, cab designs evolved into larger and extended cabs for increased passenger space. Such larger cab designs generally crowd into and limit the bed or cargo space. With such reduced bed space and with ever-increasing demand for further increasing the bed space to accommodate more cargo, new and improved supplemental cargo accommodating equipment is needed. Prior bed-extender designs have generally not met new and higher standards and requirements for additional protected space and transport of increased amounts of cargo or bulky objects particularly where flexible bed covers are needed.

SUMMARY OF THE INVENTION

The present invention is drawn to new and improved top cover and extender units for enclosing and protecting the beds of vehicles and the cargo therein and particularly those that have cabs extending into bed space for increased occupant seating.

This invention improves the capability of vehicles with cargo beds to handle and protect more cargo and bulky individual items to meet new requirements and standards. In preferred embodiments of the present invention, a pliant or flexible bed cover and extender unit is provided that can readily fit to a wide range of bed configurations and sizes to materially add to the utilitarian nature of such vehicle. This invention is particularly applicable to those vehicles with a forward cab and an aft bed having sidewalls and a rear tailgate selectively moveable between a closed bed and a bed extended position.

It is a feature, object and advantage of this invention to provide a new and improved bed extender unit with an on-board top cover for selectively extending and protectively covering the cargo bed of a motor vehicle comprising a box-like frame having a top cover of fibrous or other pliable sheet material normally rolled and stored on a spindle within a housing carried thereon. The frame is operatively mounted for limited pivotal movement between a stowed or nested position within the vehicle bed and a bed extension position in which the bed extension includes a fenced horizontally extended tailgate and in which the cover is automatically fed from a roll to ultimately provide a full bed cover.

Another feature, object and advantage of this invention is to provide a new and improved bed extender unit operatively mounting a pliable top cover for selectively fully covering the extended cargo bed of a motor vehicle. Moreover, in this invention the cover is automatically converted to a longitudinally extended top cover of the bed in response to the pivoting of the extender unit from its normal stowed or nested position in which the cover overlies only a front portion of the bed to an outboard position overlying the horizontally extending tailgate and in which the cover fully covers the extended bed.

Another feature, object and advantage of this invention is to provide a new and improved top cover and extender unit for the bed of a motor vehicle in which the unit has a conformable or pliable cover sheet that covers and protects the fully extended bed of the vehicle.

These and other features, objects and advantages of this invention will become more apparent from the detailed description and from the following drawings.

BRIEF DESCRIPTION OF THE DRAWINGS

FIG. 1 is a pictorial view of a vehicle with a bed extension and pliable top cover unit deployed in accordance with this invention;

FIG. 2a is a broken apart pictorial view of a portion of the top cover and the attachments thereof;

FIG. 4 is a side sectional view of the vehicle of FIG. 1 with parts broken away illustrating the bed extension unit in a stowed position and establishing a covered forward bed compartment;

FIG. 5 is a side view of a part of the vehicle with the extender unit and top cover being turned toward the fully extended and covered position;

FIG. 6 is a side view similar to the view of FIG. 6 showing the unit in a being further turned toward the fully extended position; and FIG. 7 is a side view similar to he view of FIGS. 5 and 6 illustrating the extension unit and flexible bed cover in a fully extended and covered position.

DESCRIPTION OF THE PREFERRED EMBODIMENT

Figure 1A:
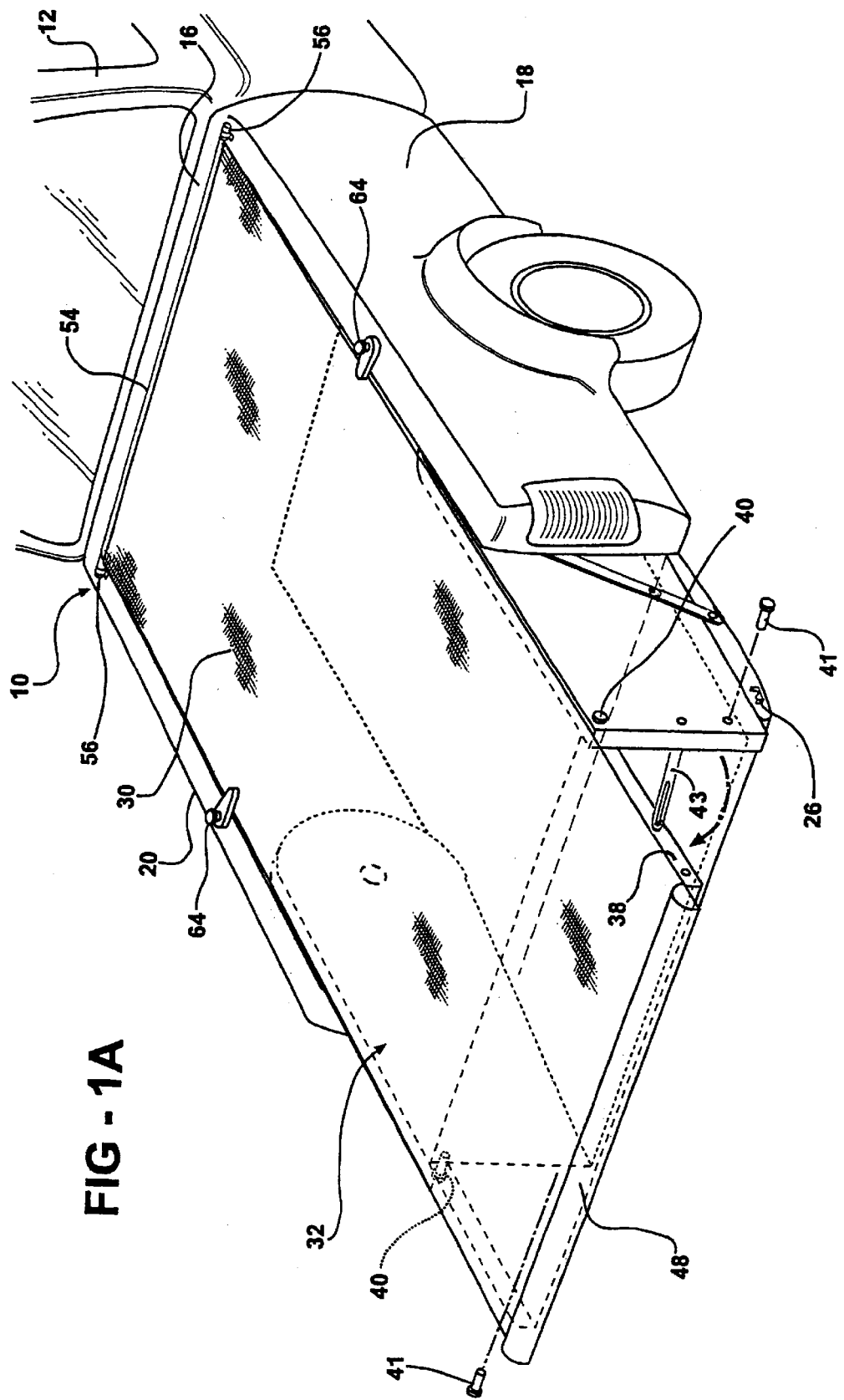
FIG. 1a is a pictorial view similar to FIG. 1 showing selective tailgate opening when the bed has been extended.
Figure 2:
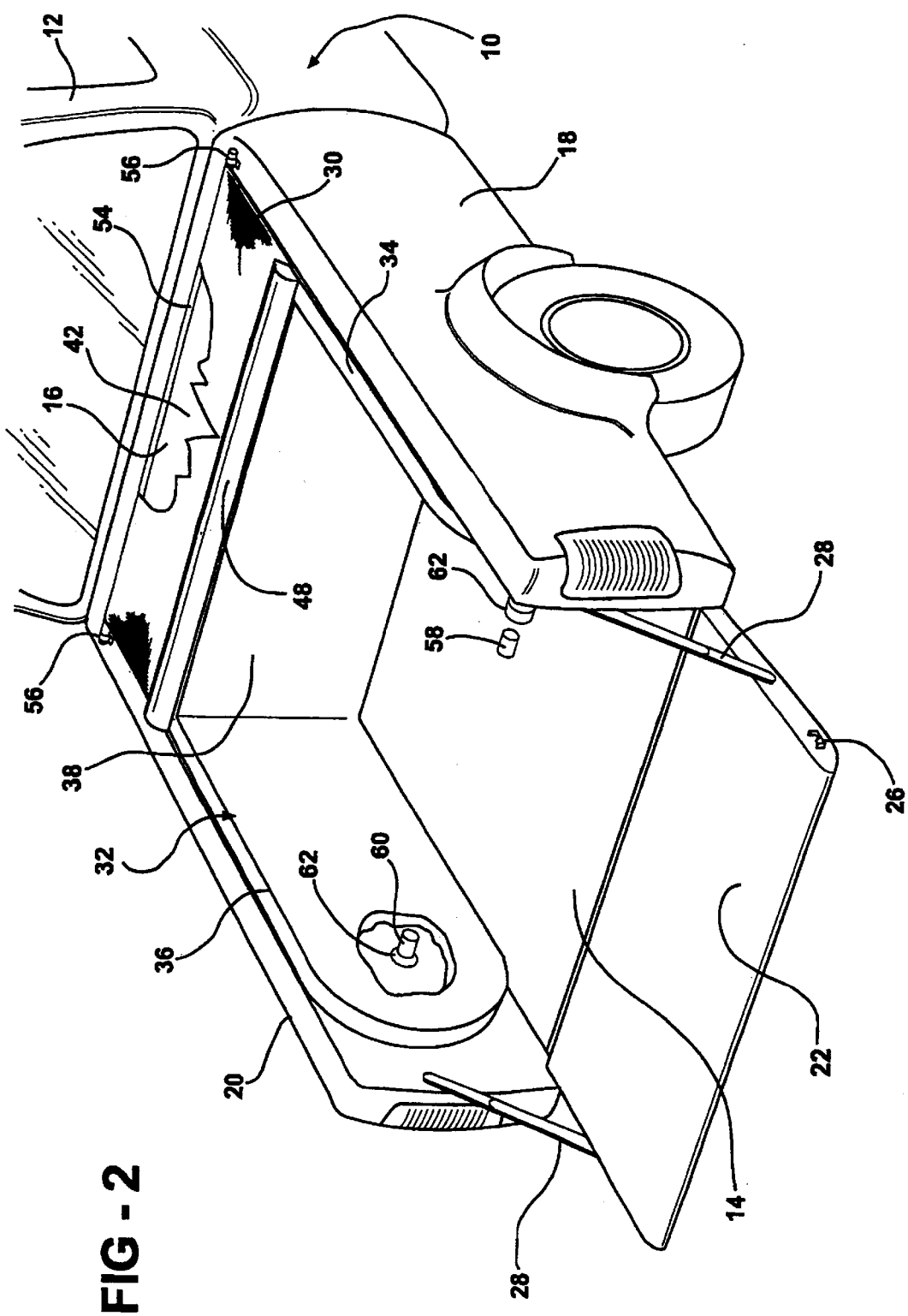
FIG. 2 is a pictorial view similar to FIG. 1 showing the bed extension and top cover unit in a stowed position with the top cover covering a forward compartment of the vehicle bed.
Figure 3:
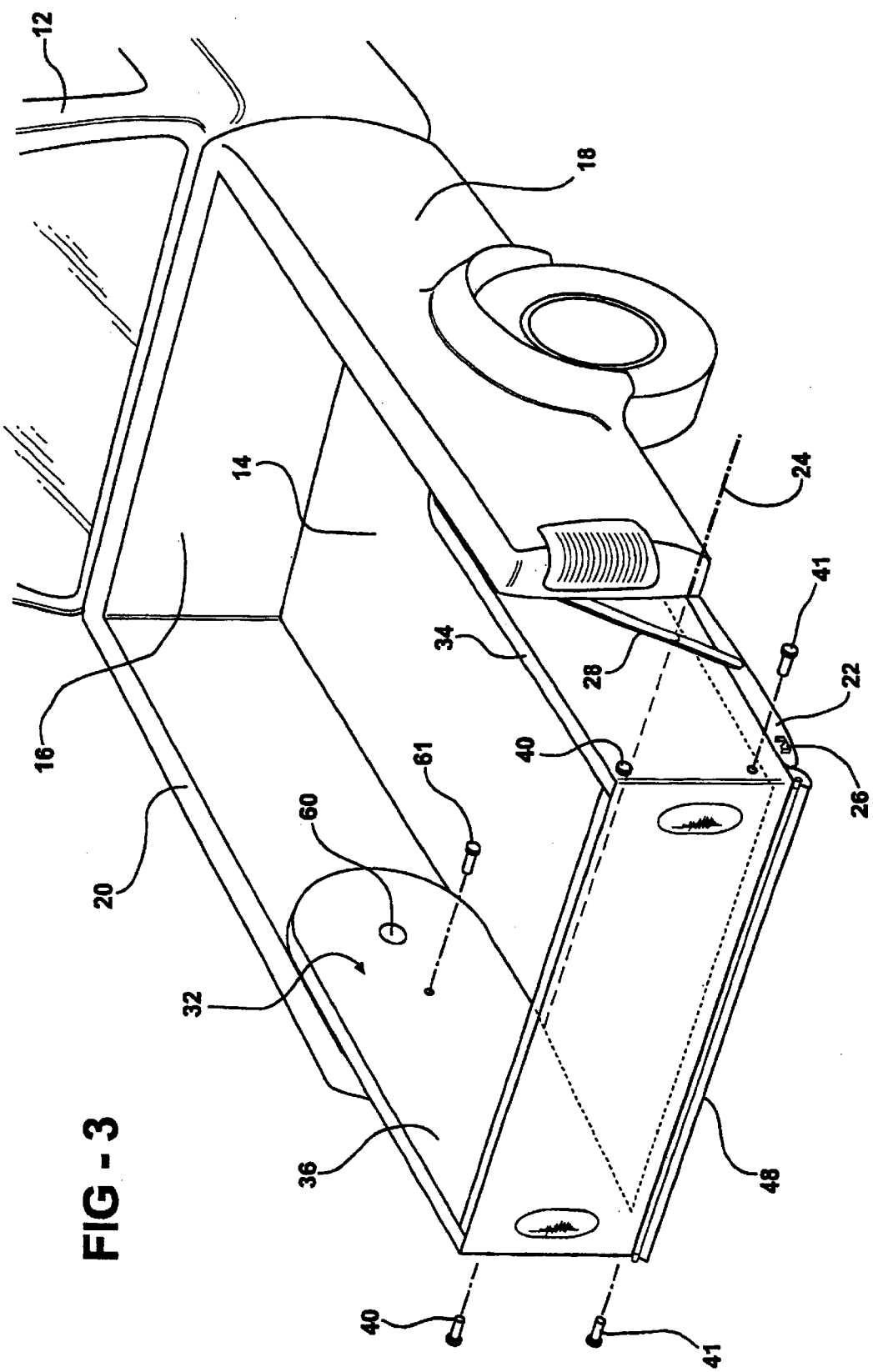
FIG. 3 is a pictorial view of a portion of the bed extender unit in a fully deployed position with the top cover maintained in a stowed position.

Turning now in detail to the drawings there is partially shown in FIGS. 1–3, a motorized vehicle 10 such as a pick-up truck that has an extended forward cab 12 accommodating the operator and passengers and a flat rear bed 14 for cargo transport. The vehicle bed 14 is bounded by upwardly rising forward end wall 16, laterally spaced right and left side walls 18, 20 extending rearwardly from connection with the forward end wall and a rear tailgate 22. The tailgate 22 is mounted for limited turning movement on the transverse pivot axis 24 of lower hinges, not shown, between an upright, bed-closure position and a horizontal, bed-extending position. Conventional latches 26 are employed to releasably secure the tailgate 22 to the opposing sidewalls in the upright position to enclose the bed. Moreover, the horizontal position of the tailgate 22 is maintained by conventional mechanism such as a lever, chain or cable system 28.

As illustrated best in FIGS. 1–3, a woven or continuous top cover sheet 30 of suitable waterproof or other protective pliable material is operatively mounted on an extender unit 32 that provides for the linear extension and selective covering of the bed 14 of vehicle 10. The unit 32 is in the form of a pivoting frame comprising a pair of laterally spaced side members 34 and 36 whose forward ends in FIG. 2 are connected to one another by a transversely extending and pivotally mounted end panel 38. The end panel 38 is operatively mounted by pairs of pivot pins 40, 41 to the side members 34 as best illustrated in FIG. 1*a*. With this construction, the end panel can function as an operable tailgate when the unit is in the bed extender position. More particularly by removing two axially aligned pins such as lower pins 41, 41, the remaining pins 40, 40 act as pivots and establish a pivot axis that allow the end panel 38 to act as a tailgate and be swung to an open position as shown to provide access to the cargo bed. If desired, closure pins 40, 40 could be removed and pins 41, 41 used to establish a lower pivot axis for the tailgate of the extension. In such circumstance the cover and its housing may be temporarily disconnected and removed from the tailgate to provide cargo bed access. The slotted bracket or mid arm 43 shown in FIG. 1*a* can be employed as a strut to hold the end panel in the illustrated upward horizontal position or as a supporting brace to support the end panel in a horizontal lower position then swung on the pivot axis provided by pins 41–41. In any event after cargo access, the removed pairs of pins 40 or 41 are replaced to secure the tailgate in a fixed and closed position. When the tailgate is pivoted on the lower pins 41, 41 to a horizontal position the cover and the housing may be removed for access to the cargo space. The housing 48 can be readily reinstalled in a preselected position on the extension tailgate, i.e. panel 38, for cover reattachment.

The frame of unit 32 may be generally U-shaped and sized to operatively fit into the enclosed bed 14 of the vehicle. As shown the side members 34, 36 are parallel to one another and lie with clearance along the inner sides of the sidewalls 18, 20 of the vehicle bed. In the stowed position of the unit, the end panel 38 is forwardly positioned in the vehicle bed but lies in a rearwardly offset and parallel position with respect to the forward end wall 16 of the vehicle bed to provide a separate forward compartment 42.

The top cover 30 being pliable is selectively rolled and stored on spring powered cylindrical roller or spindle 46 as shown in FIG. 2*a*. The spring is diagrammatically shown as spring 47 in FIG. 2*a*. Such spring powered rollers are illustrated in prior U.S. Pat. No. 3,146,824 identified above and are employed in many coverings such as roller blinds and awnings. If desired the cover can be manually rolled on the spindle such as by a hand crank. The roller 46 and the cover 30 of this invention are operatively mounted, in an elongated, shell-like housing 48 that is fixed to the top of the end panel 38 or other portions of extender unit 32 by suitable fasteners 50. The top cover 30 is fed, outwardly from the housing though an elongated feeder slot 52 laterally extending across the width thereof. The leading edge of the top cover may be secured to an elongated connector bar 54 that projects laterally from opposite edges of the top cover and can be readily fixed into hook-like brackets 56 laterally spaced across from one another and secured at forward stations on the sidewalls of the vehicle bed. This covers the forward compartment and protects cargo therein.

The extender unit 32 is further provided with laterally extending pivots 58, 60 projecting outwardly from the side members 34 and 36 thereof into transverse bushings 62 provided in the sidewalls 16, 18 of the bed. This structure operatively supports the extender unit 32 so that it can be swung approximately 180 degrees on the pivots between fully stored or nested position (FIG. 2) and fully extended position (FIG. 3). The extender unit may be releasably maintained in the extended position by a locking pin 61 extending through aligned openings on one of the sides 36 and into a catch in the side wall of the bed, FIG. 3 or by a detent attachment mechanism 63 (FIG. 7). In the extended position in movement from the FIG. 2 to the FIG. 3 position, the top cover is preferably automatically deployed for bed covering purposes. Such deployment is diagrammatically illustrated in FIGS. 4–7. In returning to the fully stored or nested FIG. 2 position from the deployed position, the top cover will be automatically retracted by the associated wind-up spring.

In the closed extended bed position (FIGS. 1 and 7) the pliable cover 30 covers the entire bed of the vehicle and fits onto the upper surface of the side members 34, 36. If roller 46, cover 30 and shelf 48 are positioned on sidewalls 34 and 36 such that they clear right and left sidewalls 18 and 20 the cover may also be released securely to sidewalls 18 and 20. The cover may be releasably secured to the top surface by suitable fasteners 64 carried by such surfaces that operatively connect the cover to the sidewalls of the vehicles. The flexible or conforming properties of the cover provides sufficient stretch to accommodate bulky cargo whose profiles may extend above the sides of the vehicle bed.

Referring to FIG. 2 and assuming the vehicle operator desires to extend and enclose the vehicle bed 14, the tailgate 22 will be manually swung from its bed-enclosing position to the horizontal bed-extended position established by the cables 28. The cover 30 of the extender unit is pulled and fed forwardly from its housing against the force of the windup spring until sufficient material has been dispensed allowing the connector rod 54 to be attached to the forwardly located brackets 56. With the cover attached to the forward stations of the bed, the unit can then be manually turned on its pivots and swung rearwardly from the nested position to the fully covered and extended position as diagrammatically, illustrated in FIGS. 4–7. This action automatically unwinds the bed cover from the spindle until the extended position is reached. In the covered position, the cover is held taut by the wind up spring. The detent or latch 63 illustrated in FIG. 7 may be provided to releasably secure the unit in the extended position. Cut outs 66 in the fabric of the cover provide openings so the rear reflectors or lights 68 may be readily observed when the unit is in the extended position.

Figure 2B:
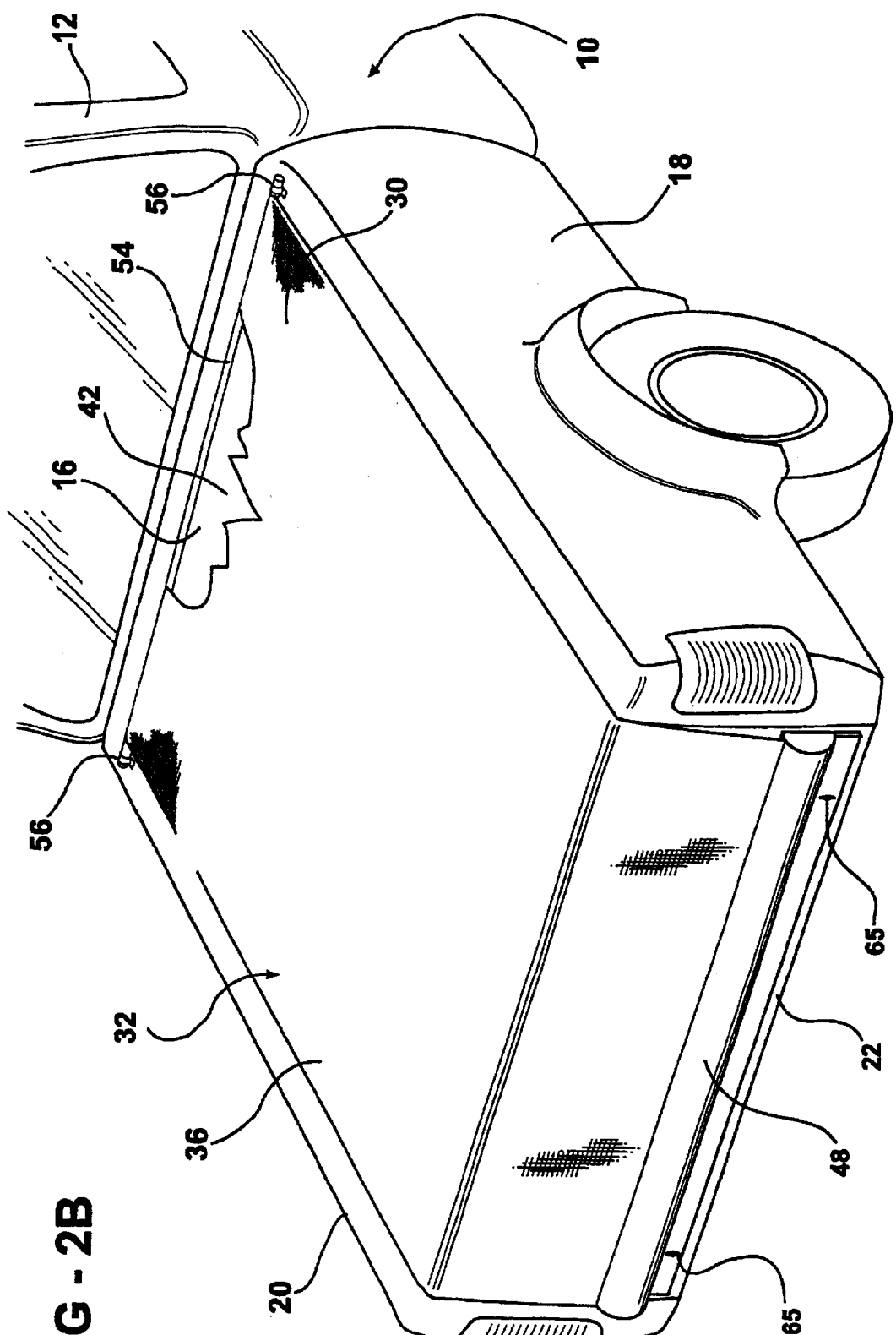
FIG. 2b is a pictorial view of the top cover being deployed with the bed extender in a nested position in the vehicle bed.

In the event covering of the short bed is needed, the housing 48 may be detached from the extender unit 32 and moved rearwardly over the closed tailgate 22 and secured thereto by quick attaching fasteners 65 as illustrated in FIG. 2*b*.

It will be appreciated that the optimal dimensional relationships for the parts of this invention including variation in sizes, clearances, materials, shapes, forms and functions and the manner of operation to suit various constructions will now be readily apparent to those skilled in the art. Accordingly, all such constructions are within the scope of the invention set forth in the following claims.

What is claimed is:

1. A unit for extending a cargo bed of an automotive vehicle having a forward cab for vehicle occupants and an end wall extending transversely behind the cab, a pair of laterally spaced side walls extending rearwardly from said end wall along opposite sides of said bed, a tailgate pivotally mounted and selectively movable between substantially horizontal and upright positions relative to said side walls for respectively extending and gating the cargo bed, the unit comprising: a pair of elongated sides having forward and trailing ends for installation in the vehicle and extending along the side walls of the cargo bed, a transversely extending end panel connecting the sides to one another adjacent to the forward ends thereof and offset from the end wall of the vehicle to establish a discrete forward compartment in said cargo bed, an elongated protective sheet of material providing a cover for the cargo bed, a carrier for storing said sheet in an accumulated condition extending along and secured relative to said end panel and for dispensing said sheet from an accumulated condition to a cargo bed covering condition, a forward connector for selectively connecting the sheet to a fixed forward station relative to the sides of said unit when dispensed from said carrier to thereby allow the sheet to initially enclose said forward compartment of said bed, pivot construction defining a transverse axis for pivotally mounting the sides of the unit to the side walls of said bed so that the unit is mounted for swinging movement on the transverse axis between a closed position nested between the sidewalls and an open position effectively extending the side walls and thereby said bed and so that said sheet is dispensed from said carrier and covers said extended bed.

2. The unit of claim 1, wherein said pivot construction is defined by pivots extending transversely and outwardly from each of said sides of said unit and into operative support on said side walls of said vehicle defining the sides of said bed to allow said unit to be moved from a first position in which the sheet overlies a forward portion of said bed to a second position in which the bed is extended by said side walls positioned on the horizontally extending tailgate and is fully covered by said sheet.

3. The unit of claim 2, wherein said pivots allow said unit to be subsequently turned from said first position to said second position and said bed is automatically covered by said sheet.

4. The unit of claim 2, wherein said pivots are disposed at a rearward and laterally extending location on each of said sides to establish a transversely oriented turning axis for the unit to allow the unit to be turned on said axis so that said sheet overlies and covers the entire extent of said bed.

5. The unit of claim 1, wherein transversely extending end panel of said unit is pivotally attached to the sides thereof so that said end panel can operate as a tailgate when said unit has been turned to the bed extended position.

6. A frame unit for extending the cargo bed of an automotive vehicle having an occupant cab immediately forward of the cargo bed and a pair of side walls extending rearwardly from said cab on either side of said bed and further having a pivotally mounted and transversely extending rear tailgate selectively movable between horizontal and upright positions relative to said side walls for respectively extending and gating the bed, comprising: a pair of laterally spaced sides adapted to lie adjacent the side walls of the vehicle, said sides having forward ends, and a transversely extending end wall connecting the sides to one another adjacent to the forward ends thereof, a cover of pliable sheet material for selectively covering the cargo bed of the vehicle, a housing for said cover operatively supported on said unit adjacent said end wall, a spindle for operatively holding said cover in a rolled and stored condition thereon in said housing, unit pivot construction for mounting said unit for swinging movement on a transverse axis between a nested position in which said sides generally extend forwardly from said pivot construction along the sidewalls of the vehicle and an extended position in which said sides extend generally rearward from said pivot construction onto the tailgate, a forward attachment for a leading edge portion of said cover in which said cover directly overlies only a forward portion of said bed when said unit is in said nested position and overlies the entire bed when said unit is in said bed extended position.

7. The construction of claim 6, wherein said housing is releasably secured to the end wall of said unit and wherein said spindle is a spring powered roller operatively mounted in said housing.

8. The frame unit of claim 6, including first fastening devices for releasably mounting said housing to said unit and second fastening devices for attaching said housing directly to said tailgate after being released from attachment with said unit so that said cover can be subsequently dispensed from said housing to cover said cargo bed when said unit is in said nested condition.

9. In combination, an automotive vehicle having a flattened cargo bed with an occupant cab immediately forward of the bed and having a pair of sidewalls extending rearwardly from said cab on either side of the bed and further having a pivotally mounted tailgate selectively movable between substantially horizontal and upright positions relative to said sidewalls, a unit for the lengthwise extension and enclosure of said bed, said unit having a pair of elongated sides having forward and trailing ends extending along the sidewalls of said bed, an end panel connecting said sides to one another adjacent to the forward ends thereof, a pliable cover protecting and covering at least one portion of the bed, a housing for said cover and for operatively supporting said cover to a forward position of said unit, an attachment for anchoring a leading end of said cover to an anchorage behind said cab, transverse pivot construction defining a laterally oriented axis for pivotally mounting the sides of the unit to the sidewalls of the bed of the vehicle so that said unit can be turned on said axis to a bed extending position in which the sides of the unit and said end panel encloses said tailgate when in a horizontal position and in which the pliable cover substantially covers the entirely of said cargo bed.

* * * * *